United States Patent [19]

Lawson

[11] 4,209,191

[45] Jun. 24, 1980

[54] QUICK MAKE-AND-BREAK LARGE DIAMETER COUPLING

[75] Inventor: John E. Lawson, Houston, Tex.

[73] Assignee: Armco Inc., Middletown, Ohio

[21] Appl. No.: 915,903

[22] Filed: Jun. 16, 1978

[51] Int. Cl.² .................................................. F16L 37/24
[52] U.S. Cl. .................................... 285/84; 285/332.2; 285/376
[58] Field of Search ............... 285/376, 401, 360, 361, 285/391, 334, 84, 332.4

[56] References Cited

U.S. PATENT DOCUMENTS

| 806,665 | 12/1905 | Henderson et al. | 285/84 |
| 815,627 | 3/1906 | Oldham | 285/84 |
| 2,207,005 | 7/1940 | Haas | 285/334 X |
| 3,388,752 | 6/1968 | Hanes et al. | 285/334 X |
| 3,442,536 | 5/1969 | Fowler | 285/376 X |
| 3,989,284 | 11/1976 | Blose | 85/46 X |
| 4,113,290 | 9/1978 | Miida | 285/334 |
| 4,165,891 | 8/1979 | Sullaway et al. | 285/18 |

*Primary Examiner*—Thomas F. Callaghan
*Attorney, Agent, or Firm*—Roylance, Abrams, Berdo & Farley

[57] ABSTRACT

For large diameter tubular goods, especially pipe strings installed in underwater wells, the invention provides an improved quick make-and-break coupling of the type in which part of one rotation causes axial engagement between coupling lugs. Back-angled surfaces are provided in a fashion achieving radial forces, under both compression and tension, which oppose radial separation of telescopically engaged male and female connector members.

2 Claims, 5 Drawing Figures

QUICK MAKE-AND-BREAK LARGE DIAMETER COUPLING

The invention provides an improved coupling of the quick make-and-break type for large diameter well pipe, tubular piling and like tubular strings, couplings according to the invention being particularly useful for making up strings of casing or riser pipe to be installed in underwater wells.

BACKGROUND OF THE INVENTION

Large diameter pipe strings are frequently made up under circumstances demanding that successive joints of pipe be connected by a coupling which, on the one hand, is capable of withstanding very large axial loads in both compression and tension yet, on the other hand, can be made up and separated very quickly by simple manipulations. The circumstances encountered during installation of casing and riser strings from an offshore drilling vessel or platform are typical. A typical conductor casing and riser string can be made up of pipe joints which are up to 60 ft. in length and 36 in. in outer diameter, the length of the combined string ranging from hundreds of feet to thousands of feet. Large tensile loads on such a string arise simply from the weight of the pipe, and since the string frequently must be driven into the well hole, very heavy compression loads and complex bending loads occur. Further, the riser of an underwater well must be maintained under tension, as by use of buoyancy devices or mechanical tensioning devices and heavy tension loads are therefore applied and, due to wave action at the vessel or platform, may vary cyclically.

Though such large diameter pipe strings can be made up with threaded couplings, the strength requirements make such couplings expensive, and making up a threaded coupling requires excessive time and labor, particularly under the circumstances encountered in offshore operations. Accordingly, workers in the art have proposed to use unthreaded quick make-and-break couplings depending on interengaged elements in the nature of "no-lead" thread segments as shown, for example, in U.S. Pat. No. 3,974,875, issued Aug. 17, 1976, to Herd et al. Other prior-art devices (as disclosed below) have used relatively heavy lugs to retain the male and female members of the coupling engaged. In prior-art devices of both types, a male connector member is welded to one end of each joint of pipe and a female member is welded to the other end, two joints of pipe being connected, for example, by lowering the male connector member of one joint into the upwardly directed female connector member of the joint last installed in the string, the lowered pipe then being rotated through part of one revolution to bring the segments or lugs of the male member into engagement beneath the segments or lugs of the female member.

In an effort to avoid occurrence of radial loads which tend to separate the two coupling members, prior-art workers have employed segments or lugs the engaged surfaces of which lie in planes at right angles to the longitudinal axis of the coupling. Surprisingly, however, it has been discovered that, while that prior-art practice is theoretically desirable, it actually increases the chances for failure of the coupling under conditions of actual use, especially when the coupling employs relatively small "no-lead" thread segments. While such couplings have achieved commercial acceptance, there has been a continuing need for improvement.

OBJECTS OF THE INVENTION

A general object of the invention is to devise a coupling of the type described which will retain the prior-art ease of making up and breaking the coupling but is much less likely to fail under heavy axial loads in tension or compression.

Another object is to provide such a coupling in which any axial load will generate a radial force tending to maintain the coupling in its properly engaged and undistorted condition.

A further object is to increase the ability of such couplings to withstand heavy axial loads without substantially increasing either the wall thickness of the connector members or the overall cost of the coupling.

SUMMARY OF THE INVENTION

Couplings according to the invention comprise a tubular female connector member and a tubular male connector member. The female member has one end adapted to be rigidly connected to one end of a joint of pipe, the opposite end face of the female member being frusto-conical and tapering at a small angle outwardly and toward the end which is to be secured to the pipe. For a substantial part of its length commencing adjacent its frusto-conical end face, the female member presents an inner surface of circular transverse cross section interrupted only by a plurality of inwardly projecting lugs, advantageously arranged in sets with each set comprising at least two lugs which are spaced apart and mutually aligned axially of the female member, the sets being equally spaced circumferentially. Each lug of each set lies generally in a transverse plane occupied by all of the corresponding lugs of the other sets. Each lug on the female member has a frusto-conical active face tapering at a small angle outwardly and toward the frusto-conical end face, the active faces all being directly away from that end face.

The male connector member has a first end portion adapted to be secured rigidly to a joint of pipe, and a body portion which is spaced from that end portion and presents a circular outer surface dimensioned to be telescopically embraced by the lugs of the female member. That body portion of the male member carries a plurality of sets of outwardly projecting lugs, advantageously arranged in sets with the number of sets being equal to the number of sets carried by the female member and each of the sets comprising a plurality of lugs equal in number to those in a set of lugs on the female member. Each lug on the male member has a frusto-conical active face which tapers outwardly and toward the first end portion of the male member at essentially the same small angle as the active faces of the lugs of the female member. The active faces of the lugs on the male member face toward the first end portion of that member and are complementary to the active faces of the lugs on the female member. The sets of lugs of the male member are equally spaced circumferentially and are so dimensioned that, when the male member is properly positioned, the lugs of the male member can pass axially by the lugs of the female member as the male member is inserted.

The first end portion of the male member joins the body portion in a transverse annular shoulder which presents a frusto-conical surface tapering outwardly and away from the first end portion at essentially the same angle as the frusto-conical end face of the female member. Thus, when the male member is fully inserted into the female member, the shoulder of the male member comes into essentially flush engagement with the frusto-conical end face of the female member. With the male member thus inserted, the active faces of the lugs of the male member are disposed to come into sliding engagement each with the active face of a corresponding one of the lugs of the female member as the male member is rotated relative to the female member. Cooperating rotational locator means are provided on the two connector members to stop relative rotation of the members when the sets of lugs of the male member are axially aligned with the sets of lugs of the female member.

DRAWINGS

In order that the manner in which the foregoing and other objects are achieved according to the invention can be understood in detail, one particularly advantageous embodiment thereof will be described with reference to the accompanying drawings, which form part of the original disclosure of this application, and wherein.

THE PRIOR-ART COUPLING OF FIG. 1

Figure 1:
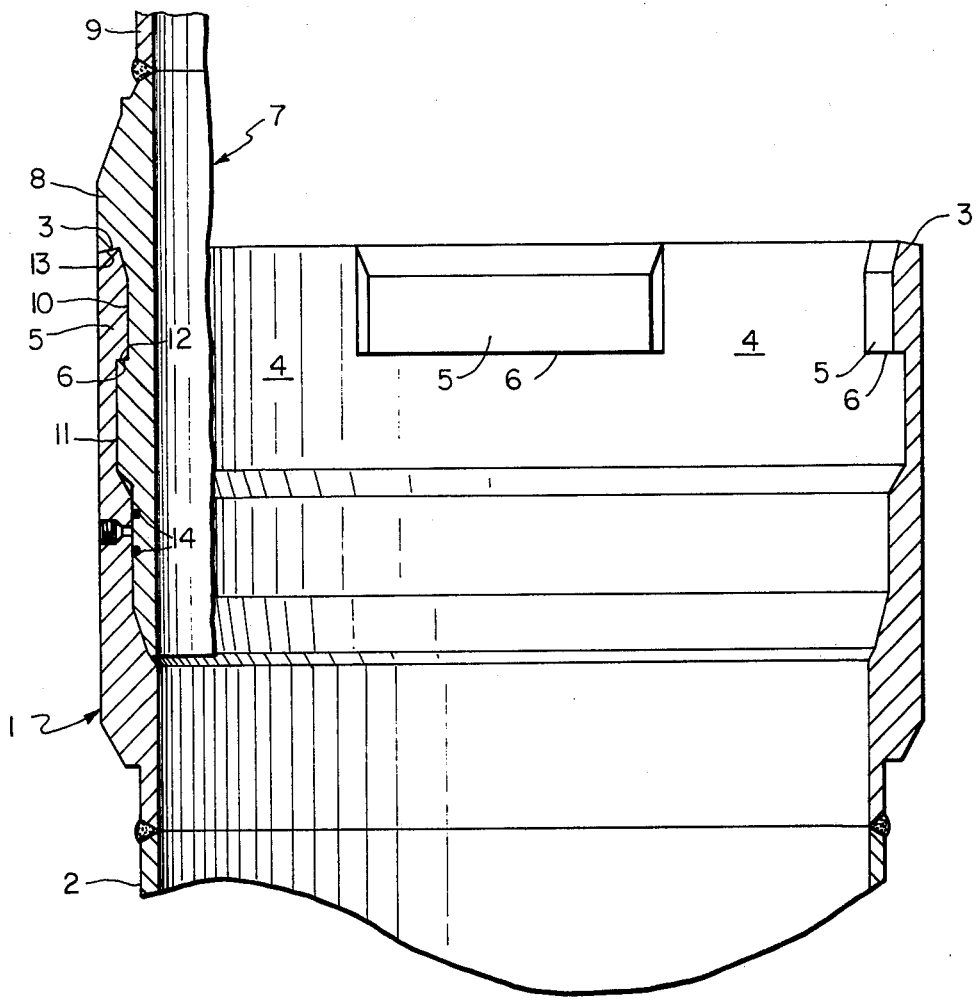
FIG. 1 is an axial cross-sectional view of a coupling according to the prior art.

FIG. 1 illustrates a coupling device employed in the prior art for making up strings of large diameter well pipe. Such devices comprise a female connector member 1 welded at one end to a joint of pipe 2 and presenting at the other end an annular end face 3 which lies in a frusto-conical plane tapering outwardly and toward pipe 2. Adjacent end face 3, inner surface 4 of member 1 is interrupted by four mutually identical circumferentially spaced inwardly projecting lugs 5 which have active faces 6 lying in a common plane at right angles to the longitudinal central axis of the coupling. Faces 6 are directed toward pipe 2.

Such devices also comprise a tubular male connector member 7 having an end portion 8 adapted to be connected, as by welding, to a second joint of pipe 9. Projecting from end portion 8 is a body portion which presents an outer cylindrical surface 10 capable of being telescopically embraced by the inner surfaces of lugs 5. The body portion of member 7 carries four outwardly projecting lugs 11 each having an active face 12 directed toward pipe 9, faces 12 all lying in a common plane at right angles to the longitudinal central axis. End portion 8 joins the body portion at a transverse annular shoulder 13 which lies in a frusto-conical plane which tapers outwardly and away from end portion 8 at the same small angle as end face 3 of the female member.

The coupling is made up by inserting member 7 into member 1 while maintaining member 7 in a rotational position such that each lug 11 passes between two adjacent lugs 5. Member 7 is inserted until shoulder 13 engages end face 3. Member 7 is then rotated through 45° to bring each lug 11 into axial alignment with a different one of lugs 5, faces 12 being slidably engaged with faces 6. A conventional rotational locator (not shown) is employed to prevent further relative rotation between members 1 and 7. To provide a fluid-tight seal between the body portion of male member 7 and the surrounding wall of female member 1, the male member is provided with transverse outwardly opening grooves to accommodate O-rings 14, in an area spaced from lugs 11 toward pipe 2.

Figure 2:
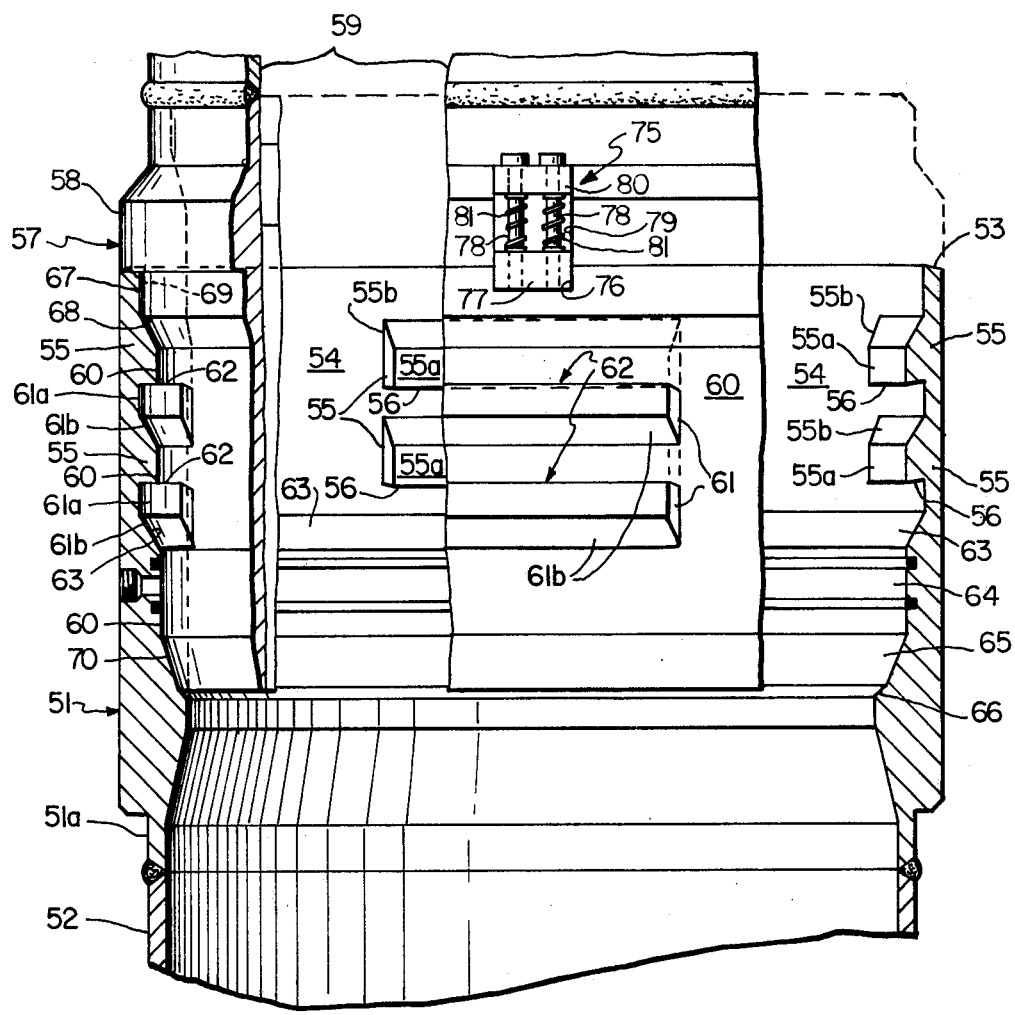
FIG. 2 is an axial sectional view, with portions in side elevation and portions broken away for clarity of illustration, of a coupling according to one particularly advantageous embodiment of the invention.
Figure 3:
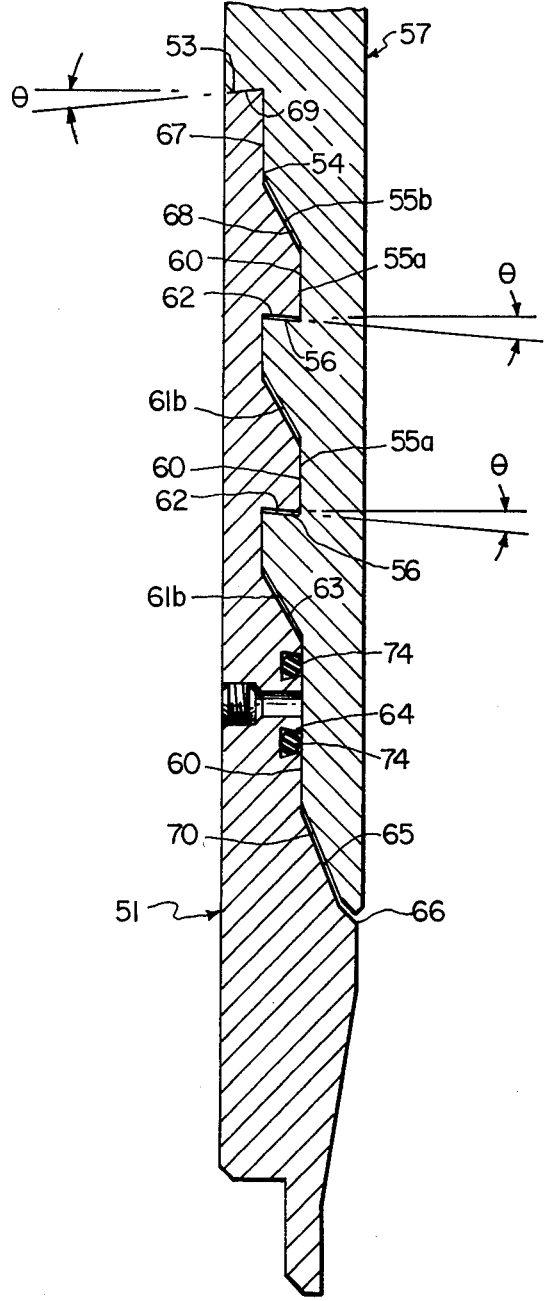
FIG. 3 is a fragmentary axial cross-sectional view, enlarged relative to FIG. 2, of a portion of the coupling of FIG. 2.

THE EMBODIMENT OF FIGS. 2 and 3

As in the prior-art device of FIG. 1, couplings according to the invention comprise a female connector member 51 comprising an integral tubular body having a first end portion 51a adapted to be rigidly connected, as by welding, to a joint of pipe 52, the opposite end of member 51 terminating in an annular end face 53 which is frusto-conical, tapering outwardly and toward pipe 52. Adjacent end face 53, the female member presents a right cylindrical inner surface portion 54 interrupted only by four sets of inwardly projecting mutually identical lugs 55, each set including two lugs. The sets of lugs 55 are equally spaced circumferentially and the lugs of each set are spaced apart axially and aligned with each other, axially of member 51. Each lug 55 has an active face 56 which is directed toward pipe 52 and constitutes part of a frusto-conical surface tapering at a small angle outwardly and toward end face 53. Active faces 56 of the four lugs 55 nearer end face 53 are all parts of a common frusto-conical surface centered on the longitudinal axis of the female member. Similarly, faces 56 of the four lugs 55 farther from end face 53 are all parts of a common frusto-conical surface. Lugs 55 have inner faces 55a which are all portions of a right cylindrical surface concentric with surface 54. The inactive faces 55b of lugs 55 which are directed toward end face 53 are portions of a common frusto-conical surface which tapers outwardly and toward end face 53.

Male connector member 57 of the coupling is in the form of an integral tubular body and includes an enlarged end portion 58 adapted to be secured rigidly, as by welding, to a second joint of pipe 59. End portion 58 is joined to a body portion which presents a right cylindrical outer surface 60 dimensioned to be slidably embraced by inner faces 55a of the lugs 55 on female member 51. Surface 60 is interrupted only by four sets of outwardly projecting mutually identical lugs 61, each set comprising two lugs which are spaced apart and aligned with each other axially of member 57. The sets of lugs 61 are equally spaced circumferentially of member 57 and respective lugs of the sets are mutually aligned circumferentially. Each lug 61 presents an active face 62 directed toward end portion 58. For the four lugs 61 nearer end portion 58, all active faces 62 constitute portions of a common frusto-conical surface tapering at a small angle outwardly and toward end portion 58. Similarly, the active faces 62 of the four lugs farther from end portion 58 constitute portions of a frusto-conical surface tapering outwardly and toward each portion 58. Lugs 61 have outer faces 61a which are parts of a common right cylindrical surface concentric with the central axis of member 57 and of a diameter such as to be slidably embraced by surface 54 of female member 51. Lugs 61 also have inactive faces 61b which are directed generally away from end portion 58. For the four legs 61 nearer portion 58, faces 61b are all portions of a common frusto-conical surface tapering inwardly and away from portion 58, and the same is true for surfaces 61b of the four lugs 61 farther from portion 58.

Cylindrical inner surface 54 of member 51 extends for a substantial portion of the length of that member and joins a transverse annular frusto-conical shoulder 63 which is directed toward end face 53 and tapers inwardly and away from face 53 at the same angle as faces 61b of the lugs on the male member. Shoulder 63 terminates at a second right cylindrical surface portion 64 which extends to yet another transverse annular shoulder 65 which tapers inwardly and away from end face 53 at a smaller angle than does shoulder 63. Shoulder 65 terminates at a radially smaller frusto-conical shoulder 66 which tapers in the same direction but at a larger angle than does shoulder 65.

As best seen by comparing FIGS. 2 and 3, the main cylindrical surface portion 60 of the body of male member 57 is spaced from end portion 58 by a slot cylindrical surface 67, which is of a diameter such as to be slidably embraced by surface 54, and which is joined to surface 60 by a transverse frusto-conical surface portion 68 tapering inwardly and away from end portion 58 at the same angle as faces 55b of the lugs on the female member. At the outer end of surface 67, end portion 58 presents a tranverse frusto-conical shoulder 69 which tapers outwardly and away from end portion 58 at the same small angle as the end face 53 of the female member. Beyond lugs 61, surface 60 joins a frusto-conical surface 70 which tapers inwardly and away from end portion 58 at the same angle as shoulder 65 of the female member.

The axial distance from end face 53 to the juncture between cylindrical surface 54 and faces 55b of the lugs 55 nearer face 53 is slightly greater than the axial distance between shoulder 69 and shoulder 68. The axial distance between end face 53 and faces 55b of the lugs 55 farther from face 53 is similarly greater than the axial distance between shoulder 69 and the faces 61b of the lugs 61 nearer end portion 58. Likewise, the axial distance between end face 53 and shoulder 63 is slightly greater than the axial distance between shoulder 69 and surface 61b. Finally, the axial distance from end face 53 to shoulder 65 is slightly greater than the axial distance between shoulder 69 and surface 70. Accordingly, as seen in FIG. 3, full insertion of male member 57 into female member 51 causes shoulder 69 to come into flush engagement with end face 53 but cannot cause any of the other surface portions of the male member which face away from end portion 58 to engage any surface of the female member. Thus, with the male member fully inserted, surface 68 does not engage faces 55b of the first set of female lugs 55, faces 61b of the nearer set of male lugs 61 do not engage faces 55b of the next set of lugs 55, surfaces 61b of the more distant male lugs do not engage shoulder 63, and surface 70 does not engage shoulder 65. Because of such lack of engagement, all axial forces acting in compression on the coupling are accepted by end face 53 and shoulder 69.

When male member 57 has been fully inserted in female connector member 51, lugs 55 on the female member and lugs 61 on the male member are so disposed that the male member can be rotated relative to the female member, with faces 62 of the male lugs sliding under faces 56 of the female lugs. Each female lug extends over almost 45° of the inner periphery of female member 51 and, the female lugs being equally spaced, a space extending for slightly more than 45° is presented between each adjacent pair of female lugs. Similarly, each male lug extends for almost 45° and, the male lugs being equally spaced, there are spaces between the male lugs adequate to accommodate the female lugs as the male member is inserted. When insertion is completed, rotation of the male member through an angle of approximately 45° brings the male lugs 61 into respective alignment, axially of the coupling, with the female lugs, so that each face 62 is fully engaged with a corresponding face 56. To assure that just the right amount of rotation is imparted to bring the male and female lugs into full engagement, a stop or locator means indicated generaly at 75, FIG. 2, is provided. Stop means 75 comprises a rectangular notch 76 in the wall of member 51, the notch being axially aligned with the mid-point of one set of female lugs 55. Notch 76 is dimensioned to snugly accommodate a stop member 77 which is carried by two guide pins 78 and slidable in an outwardly opening longitudinal groove 79 in end portion 58 of the male member. Guide pins 78 are retained by a bracket 80 fixed to end portion 58 and, between bracket 80 and stop member 77, the pins carry helical compression springs 81 which urge the combination of the stop member and the guide pins away from bracket 80, such movement being limited by engagement of the heads of the pins with the bracket. Groove 79 opens through shoulder 69 and the effective lengths of pins 78 is such that springs 81 can move stop member 77 beyond shoulder 69.

Since groove 79 is aligned with one set of female lugs 55, initial insertion of male member 57 to cause its sets of lugs 61 to pass between adjacent sets of lugs 55 will cause stop member 77 to engage end face 53 so that springs 81 are compressed and stop member 77 retracted into groove 79 as shoulder 69 moves into engagement with end face 53. In usual practice, male member 57 is turned to accomplish relative rotation between the two connector members, and such rotation is simply continued until stop member 77 is brought into alignment with notch 76, springs 81 then forcing the stop member into the notch to secure members 51 and 57 against further relative rotation.

When male member 57 has been fully inserted and rotated to engage stop member 77 in notch 76, end face 53 and shoulder 69 are in flush engagement and are the only surfaces engaged to transfer axial forces in compression from one of the two connector members to the other. As to axial forces acting in tension, tending to separate the two connector members, only the engaged lug faces, i.e., each engaged pair of faces 56 and 62, are involved. Thus, all surfaces provided to accept axial forces, whether in compression or in tension, are "back tapered" in a fashion which, as described below, assures that the coupling will not fail under axial loads.

To provide a fluid-tight seal between the male and female connector members, the female member is provided with transverse annular inwardly opening grooves which accommodate conventional O-rings 74 in an area between shoulder 63 and shoulder 70.

EFFECT OF AXIAL LOADS ON DEVICES SUCH AS THE PRIOR-ART DEVICE OF FIG. 1

Figure 4:
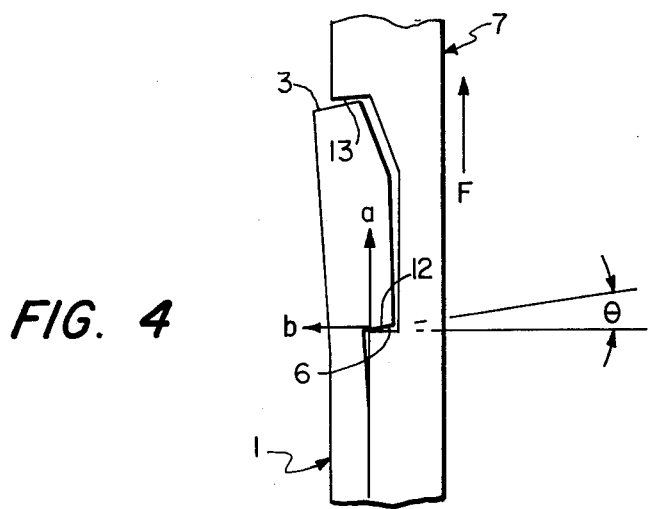
FIG. 4 is a fragmentary schematic view of a portion of the device of FIG. 1 with a vector diagram applied to illustrate how tension loads tend to distort the coupling.

Couplings according to the prior art have not been effective to handle large axial loads occurring in tension, particularly when such loads are cyclic and interrupted by occurrence of loads acting in compression. As to compressive loads, the full force occurs at interengaged surfaces 3 and 13, FIG. 1, with the desirable result that, because those surfaces are back-tapered, no large radial forces occur other than the tendency for the wall of the female member 1 to deflect in a bulging fashion. However, when large axial loads are applied in tension, the result with such prior-art couplings is to deform the wall of the female connector in a fashion tending to disengage the coupling, as seen in FIG. 4, where F is the load applied to the male member and the female is held stationary. Though the interengaged lug faces 6 and 12 are initially in planes at right angles to the longitudinal axis of the coupling, the tension load applied at these faces tends to bend the wall of female member 1 outwardly. Since the load is in tension, the back-tapered surfaces 3 and 13 separate slightly and their normal effect in opposing such bending is lost. As bending increases, the engagement of lug surface 6 with lug surface 12 changes from a flush engagement to a line engagement so that these two faces are disposed at angle $\theta$, FIG. 4. The bending tendency is increased because engagement of faces 6 and 12 concentrates the tension load in a single circumferential area where the wall thickness of the female member is smallest. As demonstrated by the vector diagram in FIG. 4, the overall result is application to female member 1 of a radial force component b equal to the tension load multiplied by the tangent of the angle $\theta$. This radial force acts to expand the wall of the female connector member, so that angle $\theta$ progressively increases and the effective, load-supporting engagement between surfaces 6 and 12 deteriorates progressively.

When the tension load is intermittent and interrupted by compression loads, the effect is to subject the upper end of female member 1 to successive opposite bending forces, first outward under tension, then inward under compression, then outward again under tension. Continual flexing of the female member leads to metal fatigue and to progressive deformation of surfaces 3, 6, 12 and 13, so that the tendency for the female member to be deformed radially increases with age of the coupling.

EFFECT OF AXIAL LOADS ON COUPLINGS ACCORDING TO THE INVENTION

Figure 5:
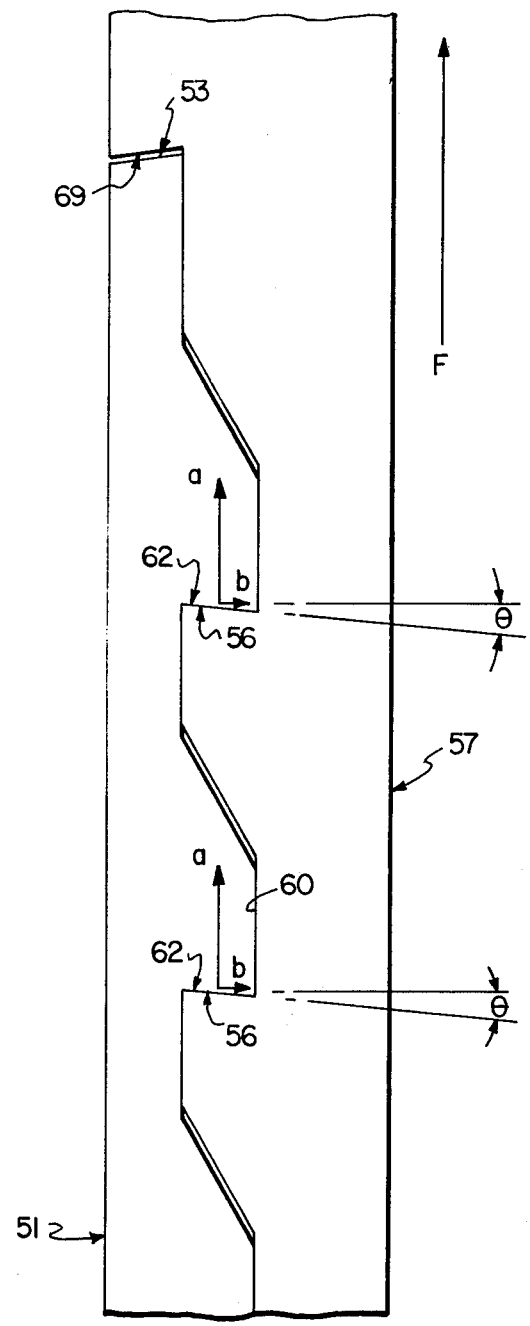
FIG. 5 is a fragmentary schematic view of a portion of the device of FIG. 2, with a vector diagram applied to illustrate how tension loads act to assure that the coupling remains engaged.

In couplings embodying the invention, wherein loads applied in tension are distributed over the interengaged faces 56 and 62 of two lugs in each set of lugs and all of the faces 56, 62 are back-tapered, the tendency toward radial distortion of the female connector member is completely eliminated, as will be apparent from FIG. 5. Here, a force F applied to the male member 57, which female member 51 is held stationary, is distributed over the interengaged faces 56, 62 of all of the lugs. Since these faces are purposely back-tapered at a small angle $\theta$, the force accepted at each set of interengaged faces 56, 62 generates a radial force component b which acts on female member 51 in a direction tending to urge that member to contract against the male member 57. The magnitude of the inwardly acting components b is equal to that portion of tension force F appearing at the particular set of interengaged lugs times the tangent of angle $\theta$. Since the plan dimensions of faces 56 and 62 are essentially equal and since the outer surface 60 of the male member is slidably engaged with the inner faces 55a of the female lugs at the outset, the radial force component simply increases the radial pressure between the walls of the female and male connector members without causing significant movement of faces 56 over faces 62, and distortion of those faces or of the lugs is therefore minimized. If the tension load increases, the inwardly acting radial force components b increase correspondingly, causing an increased tendency to resist deformation of the female member. Further, the inwardly acting radial force components b occur in two axially spaced circumferential areas and those areas are intermediate the ends of the thinner portion of the wall of the female member, so that outward deformation of the female member is resisted over at least a major portion of the length of the thinner walled portion.

Though the tension load tends to separate end face 53 and shoulder 69, there is no tendency for outward bending of the end portion of the female member at face 53. Therefore, when the tension load is followed by a compression load, shoulder 69 comes immediately into full flush engagement with surface 53.

From the foregoing, it is apparent that the small angle of back taper of end face 53 and shoulder 69, and the small angle of back taper of lug faces 56 and 62 are critical angles which are responsible for success of the invention in achieving its objects. These angles can be in the range of 2°–10°, with an angle of 5° providing excellent results. The angle for face 53 and shoulder 69 can be the same as or different from the angle for faces 56 and 62. Excellent results are attained when the back taper angle is 5° for both sets of surfaces.

Comparing FIGS. 1 and 2, it is to be noted that, in the embodiment of the invention shown in FIG. 2, the two lugs in each lug set are located in an area which is adjacent shoulder 63 of female member 51, rather than being adjacent the end face 53. Thus, unlike the prior-art embodiment of FIG. 1, the invention distributes the forces occurring at the lugs over a significant portion of the length of the thinner wall portion of the female member and locates that area as near the thicker wall portion of that member as is practical.

While surfaces 54 and 60 in the embodiment of the invention illustrated are right cylindrical surfaces, other configurations in which these surfaces have circular transverse cross sections can be employed. Thus, surfaces 54 and 60 can be frusto-conical, tapering at a small angle downwardly and inwardly.

Though it is advantageous to insert the male connector member downwardly into the female connector member, the disposition of the coupling members can be reversed, so that the female connector member can be lowered onto the male connector member.

What is claimed is:

1. In a quick make-and-break coupling for use in making up large diameter strings of pipe, tubular piling and the like, the combination of a female connector member having a tubular body comprising
 a first end portion adapted to be rigidly connected to a joint of pipe,
 a second end portion opposite said first end portion and having a circular end face which is frusto-conical and tapers at a small angle outwardly and toward said first end portion, the body of the female connector member having an inner surface portion which is of circular transverse cross section and extends from said second end portion over a major portion of the length of the female connector member, and a plurality of lugs integral with the body of the female connector member, said lugs projecting radially inwardly from said inner surface portion, said lugs being spaced apart circumferentially and mutually aligned circumferentially, each of said lugs having an active face which is directed toward said first end portion and lies in a frusto-conical surface which is concentric with the longitudinal axis of the female member and tapers at a small angle outwardly and toward said end face, said sets of lugs being spaced by a significant distance from said end face;

a male connector member having a tubular body comprising a first end portion having an end adapted to be rigidly connected to a joint of pipe, said first end portion having a first frusto-conical shoulder which faces away from said end and tapers outwardly and away therefrom at a small angle so as to be capable of essentially flush engagement with said end face of the female connector member, a body portion of reduced diameter extending from said first end portion toward the opposite end of the male connector member and having a main outer surface portion which is of circular transverse cross section and is dimensioned to be embraced by said lugs of the female connector member, and a plurality of lugs integral with said body portion of the male connector member and projecting radially outwardly from said cylindrical main outer surface portion, said lugs being mutually aligned circumferentially and spaced apart circumferentially by distances such that, upon insertion of the male connector member into the female connector member each of the lugs of the male connector member will pass between an adjacent pair of lugs of the female connector member, each of said lugs of the male connector member having an active face which is directed toward said first shoulder and which lies in a frusto-conical surface tapering outwardly and toward said shoulder at essentially the same small angle as the active faces of the lugs on the female connector member, said lugs of the male connector member being spaced from said first shoulder by a distance such that, when the male connector member has been inserted in the female member to seat said shoulder on said end face of the female connector member, said active faces of said lugs of the male connector member will be disposed to come into sliding face-to-face engagement with the respective active faces of said lugs of the female connector member when relative rotation of the connector members brings the lugs of the male connector member into axial alignment with the lugs of the female connector member; and stop means comprising first means carried by the female connector member and coacting second means carried by the male connector member, said stop means being constructed and arranged to stop relative rotation of the male and female connector members when the lugs of the male connector member are each axially aligned respectively with a lug of the female connector member, the lugs of the female connector member being arranged in sets, the sets of lugs each comprising at least two lugs spaced apart axially of the female connector member, the corresponding lugs of the sets being mutually aligned circumferentially, the sets of lugs occupying a substantial portion of the length of said inner surface portion intermediate the ends thereof, the lugs of the male connector member also being arranged in sets each having the same number of lugs as do the sets of lugs of the female connector member with the lugs of each set spaced apart axially of the male connector member, the corresponding lugs of the sets being mutually aligned circumferentially, each of said lugs of the female connector member including an inner face which is of circular transverse cross section and of significant length axially of the female connector member, said inner face being concentric with said inner surface portion, and an inactive face which is opposite to the active face of the lug and lies in a generally frusto-conical surface which tapers inwardly and away from said end face, said inactive faces of the lugs of the female connector member nearer said end face joining said inner surface portion of the female connector member in a location spaced axially from said end face and there is therefore a significant portion of said inner surface portion located between said end face and said lugs, said body of said male connector member including a portion having an intermediate outer surface portion which is of circular transverse cross section and is dimensioned to be embraced by said inner surface portion, said intermediate surface portion joining with said main outer surface portion in a second frusto-conical shoulder which tapers inwardly and away from said first shoulder, the axial distance from said first shoulder to said second shoulder being smaller than the axial distance from said end face of the female member to said inactive faces of the lugs of said female member nearer said end face whereby, when the male member is inserted in the female member to seat said first shoulder on said end face, said second shoulder does not engage said inactive faces of the lugs of the female member.

2. In a quick make-and-break coupling for use in making up large diameter strings of pipe, tubular piling and the like, the combination of a female connector member having a tubular body comprising a first end portion adapted to be rigidly connected to a joint of pipe, a second end portion opposite said first end portion and having a circular end face which is frusto-conical and tapers at a small angle outwardly and toward said first end portion, the body of the female connector member having an inner surface portion which is of circular transverse cross section and extends from said second end portion over a major portion of the length of the female connector member, and a plurality of lugs integral with the body of the female connector member, said lugs projecting radially inwardly from said inner surface portion, said lugs being spaced apart circumferentially and mutually aligned circumferentially, each of said lugs having an active face which is directed toward said first end portion and lies in a frusto-conical surface which is concentric with the longitudinal axis of the female member and tapers at a small angle outwardly and toward said end face, said sets of lugs being spaced by a significant distance from said end face;

a male connector member having a tubular body comprising a first end portion having an end adapted to be rigidly connected to a joint of pipe, said first end portion having a first frusto-conical shoulder which faces away from said end and tapers outwardly and away therefrom at a small angle so as to be capable of essentially flush engagement with said end face of the female connector member, a body portion of reduced diameter extending from said first end portion toward the opposite end of the male connector member and having a main outer surface portion which is of circular transverse cross section and is dimensioned to be embraced by said lugs of the female connector member, and a plurality of lugs integral with said body portion of the male connector member and projecting radially outwardly from said cylindrical main outer surface portion, said lugs being mutually aligned circumferentially and spaced apart circumferentially by distances such that, upon insertion of the male connector member into the female connector member each of the lugs of the male connector member will pass between an adjacent pair of lugs of the female connector member, each of said lugs of the male connector member having an active face which is directed toward said first shoulder and which lies in a frusto-conical surface tapering outwardly and toward said shoulder at essentially the same small angle as the active faces of the lugs on the female connector member, said lugs of the male connector member being spaced from said first shoulder by a distance such that, when the male connector member has been inserted in the female member to seat said shoulder on said end face of the female connector member, said active faces of said lugs of the male connector member will be disposed to come into sliding face-to-face engagement with the respective active faces of said lugs of the female connector member when relative rotation of the connector members brings the lugs of the male connector member into axial alignment with the lugs of the female connector member; and stop means comprising first means carried by the female connector member and coacting second means carried by the male connector member, said stop means being constructed and arranged to stop relative rotation of the male and female connector members when the lugs of the male connector member are each axially aligned respectively with a lug of the female connector member, the lugs of the female connector member being arranged in sets, the sets of lugs each comprising at least two lugs spaced apart axially of the female connector member, the corresponding lugs of the sets being mutually aligned circumferentially, the sets of lugs occupying a substantial portion of the length of said inner surface portion intermediate the ends thereof, the lugs of the male connector member also being arranged in sets each having the same number of lugs as do the sets of lugs of the female connector member with the lugs of each set spaced apart axially of the male connector member, the corresponding lugs of the sets being mutually aligned circumferentially, each of said lugs of the female connector member including an inner face which is of circular transverse cross section and of significant length axially of the female connector member, said inner face being concentric with said inner surface portion, and an inactive face which is opposite to the active face of the lug and lies in a generally frusto-conical surface which tapers inwardly and away from said end face, each of said lugs of the male connector member including an outer face which is part of a right circular surface concentric with said main outer surface portion and dimensioned to be slidably embraced by said inner surface portion of the female connector member, and an inactive face which is opposite to the active face of the lug and lies in a generally frusto-conical surface which tapers inwardly and away from said first end portion at substantially the same angle as the inactive faces of the lugs of the female member, said lugs being so dimensioned and arranged that, when the male member is inserted in the female member to seat said first shoulder on said end face, said inactive faces of the lugs of the male member do not engage the female member.

* * * * *